United States Patent
King et al.

(10) Patent No.: US 11,587,750 B2
(45) Date of Patent: Feb. 21, 2023

(54) ELECTROMECHANICAL RELAY CONSTRUCTIONS

(71) Applicant: TE Connectivity Corporation, Berwyn, PA (US)

(72) Inventors: Alexander Raymond King, Lancaster, PA (US); Marc Keener, Kernersville, NC (US); Leigh Marolf, Harrisburg, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 964 days.

(21) Appl. No.: 16/399,885

(22) Filed: Apr. 30, 2019

(65) Prior Publication Data
US 2020/0350132 A1    Nov. 5, 2020

(51) Int. Cl.
| | |
|---|---|
| *H01H 47/00* | (2006.01) |
| *G01K 13/00* | (2021.01) |
| *H01H 45/02* | (2006.01) |
| *H01H 45/14* | (2006.01) |

(52) U.S. Cl.
CPC ........... *H01H 47/002* (2013.01); *G01K 13/00* (2013.01); *H01H 45/02* (2013.01); *H01H 45/14* (2013.01); *H01H 2239/06* (2013.01)

(58) Field of Classification Search
CPC ..... H01H 50/54; H01H 9/106; G01R 31/3278
See application file for complete search history.

(56) References Cited

U.S. PATENT DOCUMENTS

| | | | | |
|---|---|---|---|---|
| 4,258,344 A | * | 3/1981 | Nishimi | H01H 50/16 335/188 |
| 4,314,300 A | * | 2/1982 | Griffith | H01H 9/106 361/13 |

(Continued)

FOREIGN PATENT DOCUMENTS

| | | |
|---|---|---|
| JP | H02 72520 A | 3/1990 |
| JP | 2010 103116 A | 5/2010 |
| WO | 2016 / 075128 A1 | 5/2016 |

OTHER PUBLICATIONS

European Search Report, dated Sep. 28, 2020, EP 20 17 1237, European Application No. 20171237.9-1202.

*Primary Examiner* — Jermele M Hollington
*Assistant Examiner* — Temilade S Rhodes-Vivour

(57) ABSTRACT

Electromechanical relay constructions comprise an external housing, a pair of switchable electrical contacts disposed within the housing, an element for activating the pair of electrical contacts, and a temperature sensing element disposed within the housing adjacent the electrical contracts. The temperature sensing element provides a signal for determining the temperature within the relay housing. The relay may comprise two or more temperature sensing elements disposed within the housing a desired distance from one another. The temperature sensing element may be attached to a member or substrate disposed within the housing, may be attached to an existing internal structure of the housing, or may be attached to one of the contacts. The temperature sensing element may be selected from the group consisting of resistance temperature detectors, negative temperature coefficient thermistors, thermopile sensors, thermocouples, and combinations thereof.

20 Claims, 9 Drawing Sheets

(56) References Cited

U.S. PATENT DOCUMENTS

| | | | |
|---|---|---|---|
| 2010/0046126 A1* | 2/2010 | Elms | H01H 83/04 |
| | | | 361/103 |
| 2012/0139362 A1* | 6/2012 | Fichtlscherer | H01H 47/02 |
| | | | 307/113 |
| 2017/0053762 A1* | 2/2017 | King | H01H 47/22 |
| 2018/0158633 A1* | 6/2018 | Brandt | G01R 31/3278 |

* cited by examiner

200
ELECTROMECHANICAL RELAY CONSTRUCTIONS

FIELD

Electromechanical relays as disclosed herein are constructed to provide information regarding a desired operating condition of the relay, wherein such information may be used to monitor the performance of the relay to determine whether the relay is performing within or outside of determined operating parameters.

BACKGROUND

The use of relays such as electromechanical relay devices for purposes of providing electrical switching functions is well known in the art. Such relay devices are generally electrically operated switches used to control the presence or absence of current flowing through a circuit between electrical components, such as from a power source to one or more electrical components that receive power from the power source. Some relays use an electromagnet to mechanically operate a switch. The electromagnet is configured to physically translate a movable electrical contact relative to one or more stationary relay contacts. The movable electrical contact may form or close a circuit (allowing current to flow through the circuit) when the movable relay contact engages one or more of the stationary relay contacts. Moving the movable electrical contact away from the stationary relay contact(s) breaks or opens the circuit (ceasing the flow of current through the circuit) and/or closes another circuit.

Such relays may be used for a variety of different switching functions, including in power applications that involve high levels of current. The surface of such contacts is oftentimes a point of failure in high current applications. A potential indicator of a pending failure of a relay may be a rise in the temperature of the contact, e.g., due to resistive heating as the contact degrades with use.

It is, therefore, desired that relays be constructed in a manner that provide information regarding a temperature condition of the relay, wherein such information may be provided locally, e.g., on the relay itself, or be sent to a remote location if desired for the remote relay monitoring. It is further desired that such relay be constructed in a manner that provides information regarding the temperature within the relay that reflects a temperature increase at the contacts, and that does so in a manner that is both timely or responsive to any such temperature increase, and that is accurate. It is further desired that such relays comprising this functionality be constructed in a manner that, to the extent possible, does not increase the overall size of the relay.

SUMMARY

Electromechanical relay constructions as disclosed herein generally comprise an external housing, a pair of switchable electrical contacts disposed within the housing, an element for activating the pair of electrical contacts, and a temperature sensing element disposed within the housing adjacent the electrical contacts. The temperature sensing element or sensor may be connected with one or more electrical contacts extending a location outside of the housing for receiving an output signal or may be configured with elements to provide an output signal wirelessly from the relay. The relay may comprise two or more temperature sensing elements disposed within the housing a desired distance from one another. In an example, the temperature sensing element may be attached to a member that is mounted within the housing, and may be positioned on the member adjacent to the electrical contacts. In an example, the temperature sensing element is connected with a portion of one of the contacts. In an example the temperature sensing element is disposed along an existing internal structure of the relay, wherein the internal structure is adjacent one or both of a stationary one and a movable one of the contacts. The temperature sensing element may be selected from the group consisting of resistance temperature detectors, negative temperature coefficient thermistors, thermopile sensors, thermocouples, and combinations thereof. The relay construction may comprise more than one pair of switchable electrical contacts disposed in the housing.

The temperature within such example electromechanical rely constructions may be determined by operating the electromechanical relay causing the contacts to make contact with one another, and monitoring an output from the temperature sensing element disposed within the relay housing to determine the temperature within the relay when the contacts are in a steady state condition in contact with each other, and/or when the contacts are being switched on and off.

BRIEF DESCRIPTION OF THE DRAWINGS

Electromechanical relays or relay constructions as disclosed herein will now be described by way of example with reference to the accompanying Figures, of which.

DETAILED DESCRIPTION

Figure 1A:
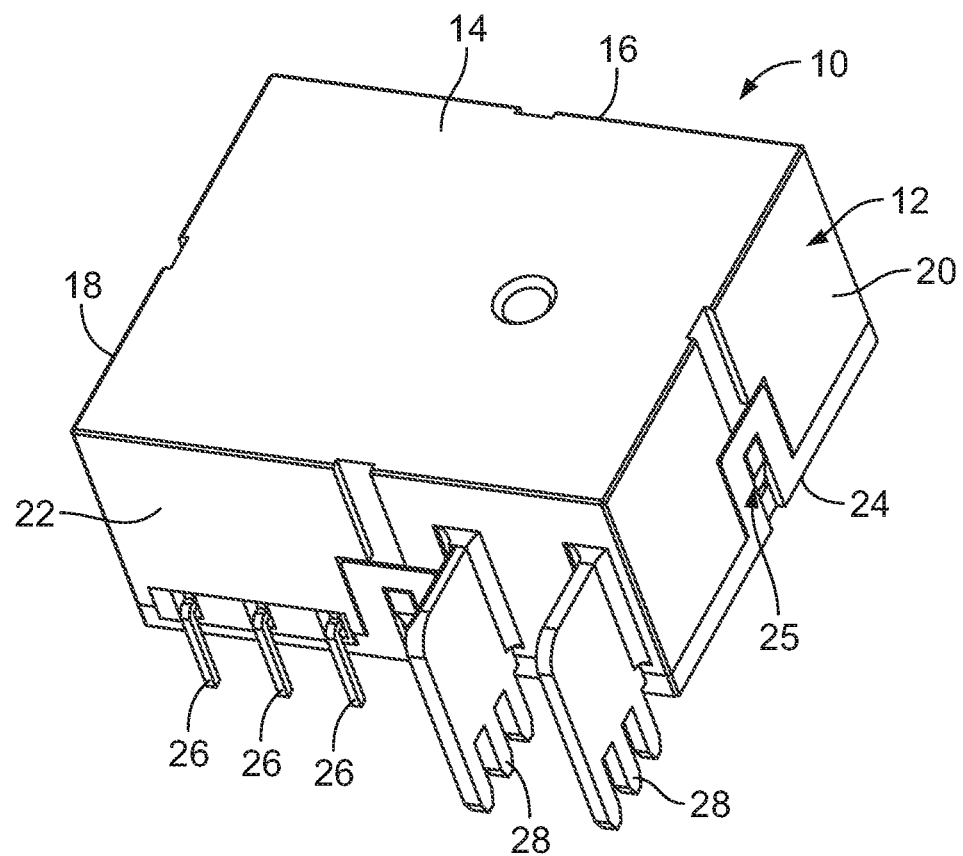
FIG. 1A is side perspective view of an example relay construction as disclosed herein.
Figure 1B:
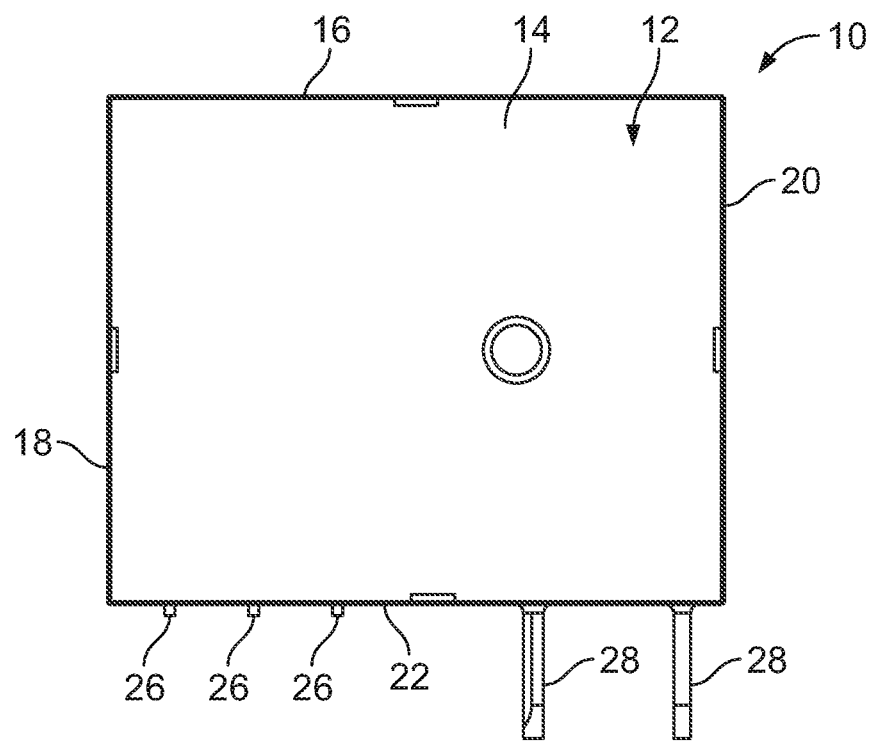
FIG. 1B is a top view of the example relay construction of FIG. 1A.
Figure 1C:
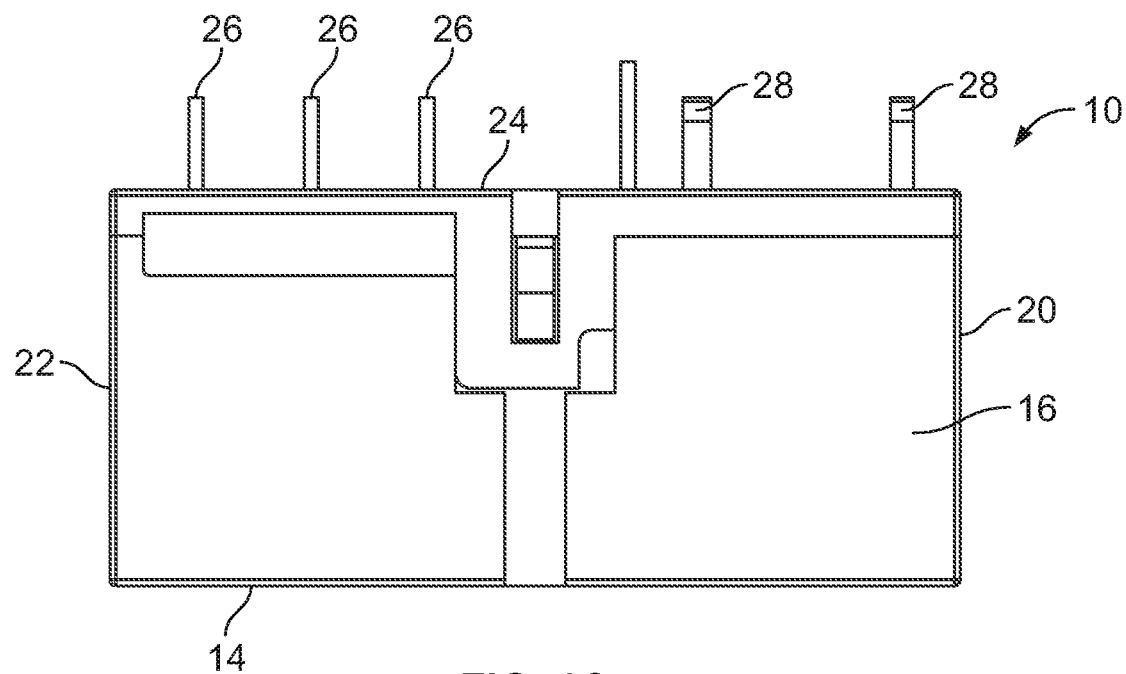
FIG. 1C is a front view of the example relay construction of FIG. 1A.

Embodiments of electromechanical relays or relay constructions will be described hereinafter in detail with reference to the attached drawings, wherein like reference numerals refer to the like elements. Relay constructions as disclosed herein may, however, be embodied in many different forms and should not be construed as being limited to the embodiments set forth herein; rather, these embodiments are provided so that the disclosure will be thorough and complete, and will fully convey the concept of electromechanical relays or relay constructions to those skilled in the art.

Relay constructions as disclosed herein generally comprise a housing and a pair of contacts disposed within the housing, wherein the relay is configured to include a temperature sensor that is disposed internally within the relay, and that is constructed and/or positioned in a manner that is intentionally engineered to provide an indication of contact temperature in a manner that is both responsive to temperature increases and that is accurate for purposes of monitoring the operating conditions of the contacts in the relay. In example, such temperature information may be used for safety purposes, in the event that the failure of the relay may cause a safety issue, and/or for preventative maintenance purposes, e.g., to remove the relay from service before failure once a predetermined temperature condition is detected. In an example, such temperature information may be useful to detect or indicate a failure of a system or component connected to the relay, e.g., a short circuit of one or more connected components and/or circuits, which would be indicated by a sharp rise in contact current and therefore contact temperature. In an example embodiment, the relay may be configured to transmit such the temperature information to a remote location for such monitoring purposes. In an example embodiment, such relay constructions may be used in power applications that involve high current levels, but it is to be understood that relay constructions as disclosed herein may be used in a variety of other relay applications where such temperature information would be useful.

Figure 1D:
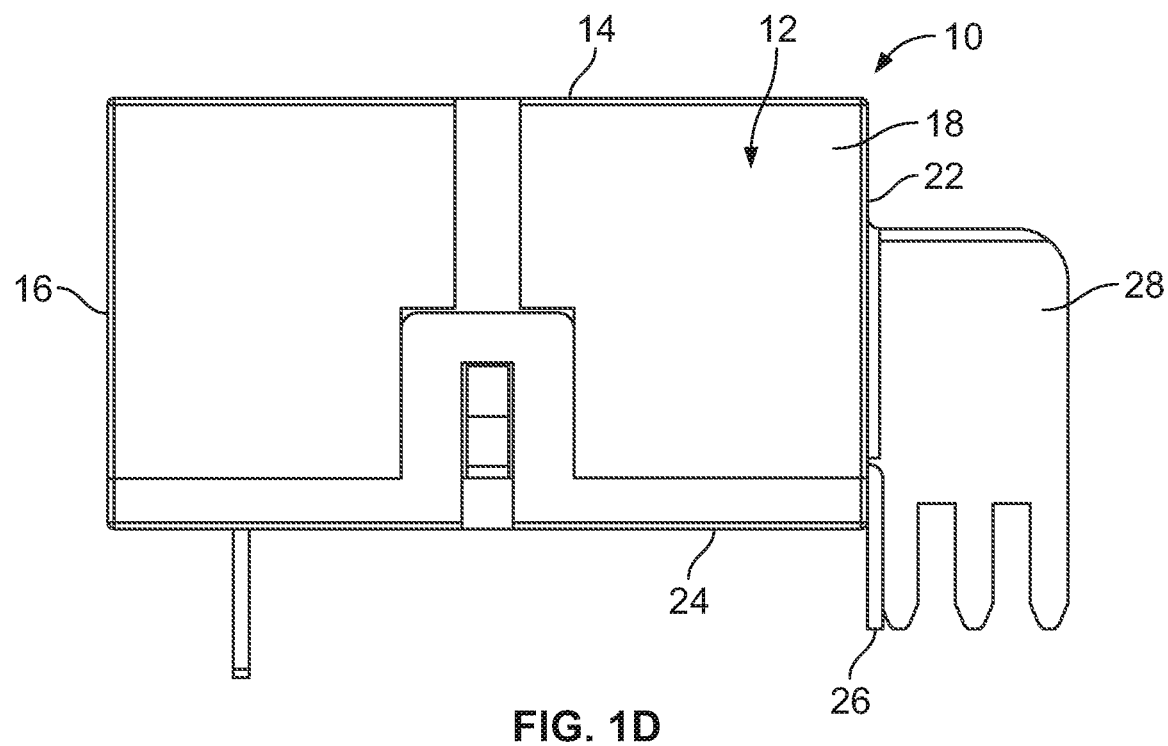
FIG. 1D is a side view of the example relay construction of FIG. 1A.

FIGS. 1A to 1E illustrate different views of an example relay 10 that may be configured comprising a temperature sensor feature as disclosed herein. FIG. 1 A to FIG. 1D illustrate an example relay 10 comprising a housing 12 having a top 14, front 16, sides 18 and 20, back 22, and a base 24. The housing may comprise a latch 25 configured to releasably connect the housing 12 to the base 24. The housing back 22 may include electrical switching terminals 26 and electrical power terminals 28 projecting outwardly therefrom for connection with electrical connections as called for to provide the desired electrical switching the transmission of power through the relay.

Figure 1E:
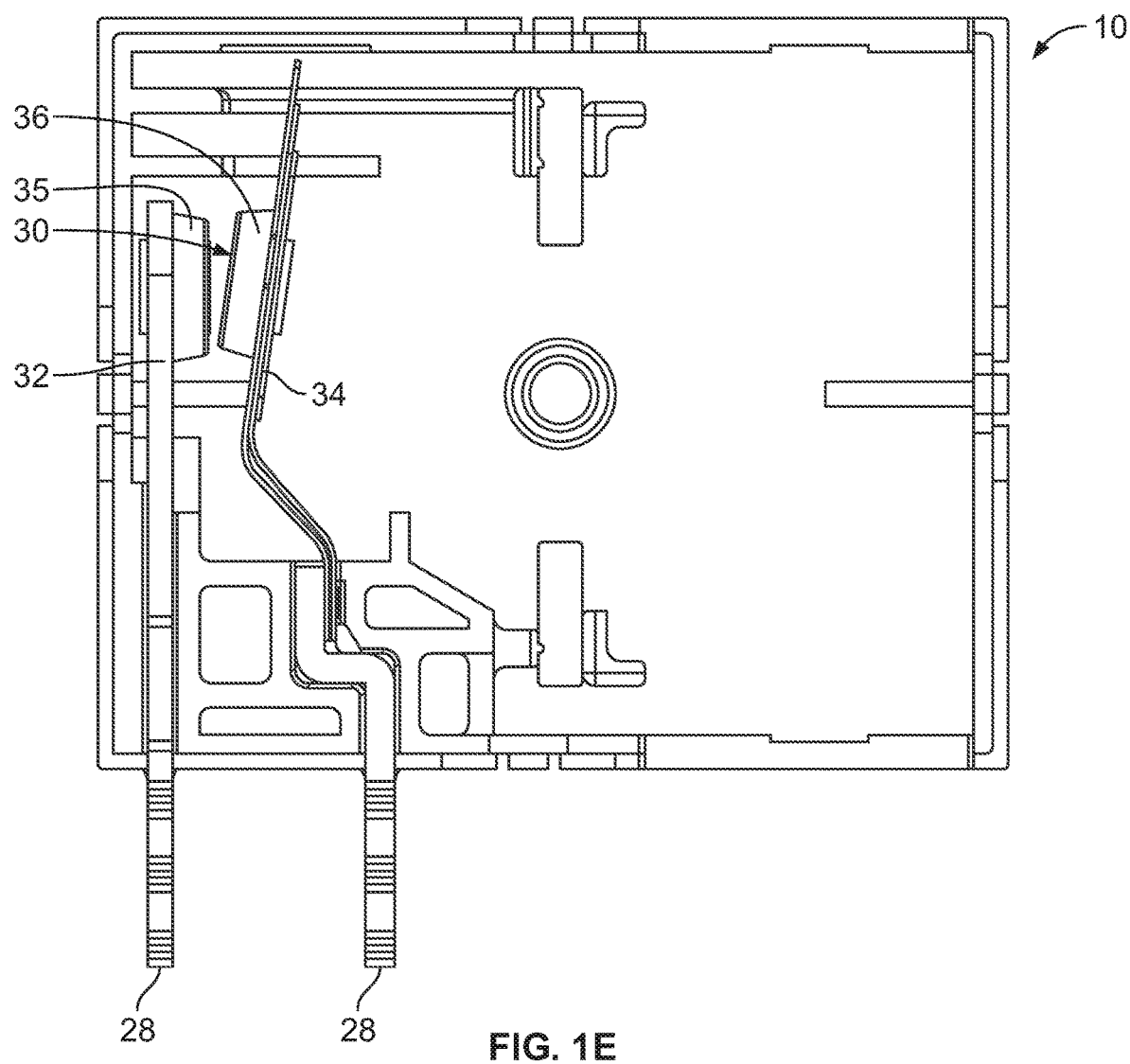
FIG. 1E is a cut-away bottom view of the example relay construction of FIG. 1A.

FIG. 1E illustrates a view of the internals within the example relay 10 comprising a pair of contacts 30 including a non-movable or stationary contact 32 and a moveable contact 34. Each contact 30 and 32 comprises a respective contact pad 35 and 36 disposed thereon that are positioned on the contact to touch one another when the movable contact is moved to the stationary contact. In FIG. 1E, the pair of contacts are shown in an open position with the pad 36 of the movable contact 34 not touching or making contact with the pad 35 of the stationary contact 32. As illustrated, each of the contacts 32 and 34 are connected to respective electrical terminals 28 extending from the relay.

As noted, a feature of relay constructions as disclosed herein is that such includes a temperature sensor that is disposed within the hosing in a close proximity to one or both of the contacts. The temperature sensor useful in such construction may be of a variety of different types for detecting a temperature within the relay indicative of the contact temperature and capable of providing an output signal therefrom for purposes of determining the temperature using a processor, controller or other device configured for receiving an input signal and determining a temperature therefrom. In an example embodiment, the temperature sensors useful for making relay constructions as disclosed herein may be in the form of contact and/or infrared temperature sensors selected from the group including and not limited to resistance thermometer or resistance temperature detectors (RTD), NTC thermistor or temperature sensors, transducers, silicon-based temperature sensors, thermopile or infrared temperature sensors, and the like.

The type of temperature sensor that is used may influence where the temperature sensor is mounted in order to obtain a responsive and accurate indication of contact temperature and/or temperature change within the relay. The following description and figures introduce different example relay construction embodiments comprising different temperature placement positions as may be influenced by the type of temperature sensor for purposes of reference and example.

Figure 2:
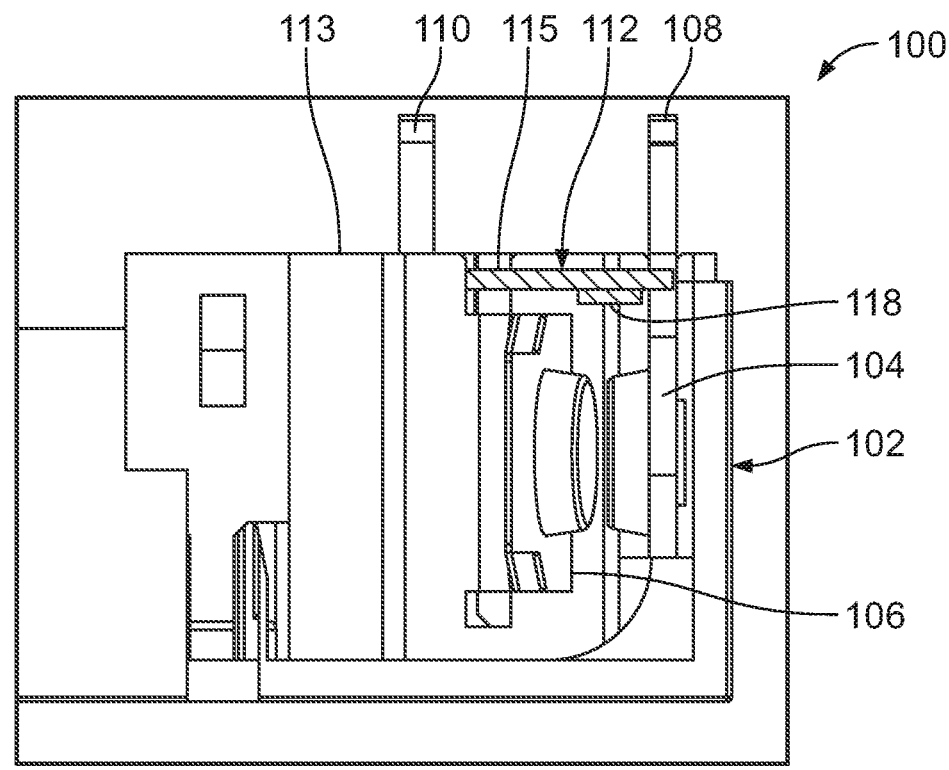
FIG. 2 is a cut-away front view of an example relay construction as disclosed herein.

FIG. 2 illustrates a sectional cut-away front view of an example relay construction 100 as disclosed herein comprising a housing 102, a pair of contacts 104 and 106, electrical terminals 108 and 110 connected with the respective contacts 104 and 106, and the remaining elements featured in the relay construction as illustrated in FIG. 1E. In this example, a temperature sensor 112 is positioned adjacent the housing bottom surface 113, or may be mounted or otherwise attached to the housing bottom surface. In an example each of the contacts 104 and 106 includes respective contact pads 114 and 116 attached thereto that are positioned to make contact with one another when the contacts are in a closed state.

In an example, the temperature sensor 112 may comprise a printed circuit board 115 with the sensor element 118 attached thereto. In an example, the printed circuit board may be configured having an integrated circuit for powering and/or receiving an output signal from the sensor element, and may also include an electrical connector (not shown) extending therefrom and outside of the housing for purposes of electrically connecting therewith to receive the output signal from the sensor element. Alternatively, the temperature sensor may be connected to components useful for receiving and/or providing an output signal wirelessly. In an example, the sensor element 118 may be RTD/NTC type temperature sensor, or a thermopile/IR sensor which looks at the contact surface or one or both contacts for faster response readings. In this example, the temperature sensor 112 is positioned adjacent the pair of contacts 104 and 106, and more specifically along a plane parallel to and above a longitudinal axis running along the length of the contacts.

In an example embodiment, the temperature sensor is positioned a distance directly above the pads of the contacts. In an example embodiment, the temperature sensor element is positioned a distance of from about 1 mm to 10 mm, from about 2 mm to 5 mm, and from about 2 mm to 4.2 mm from the contact pads 114 and 116 of the respective contacts 104 and 106. It is to be understood that while placement distances for the temperature sensor of this example have been provided, such distance can and will vary depending on such factors as the type of relay as well as the particular type of sensor device that is used.

Figure 3:
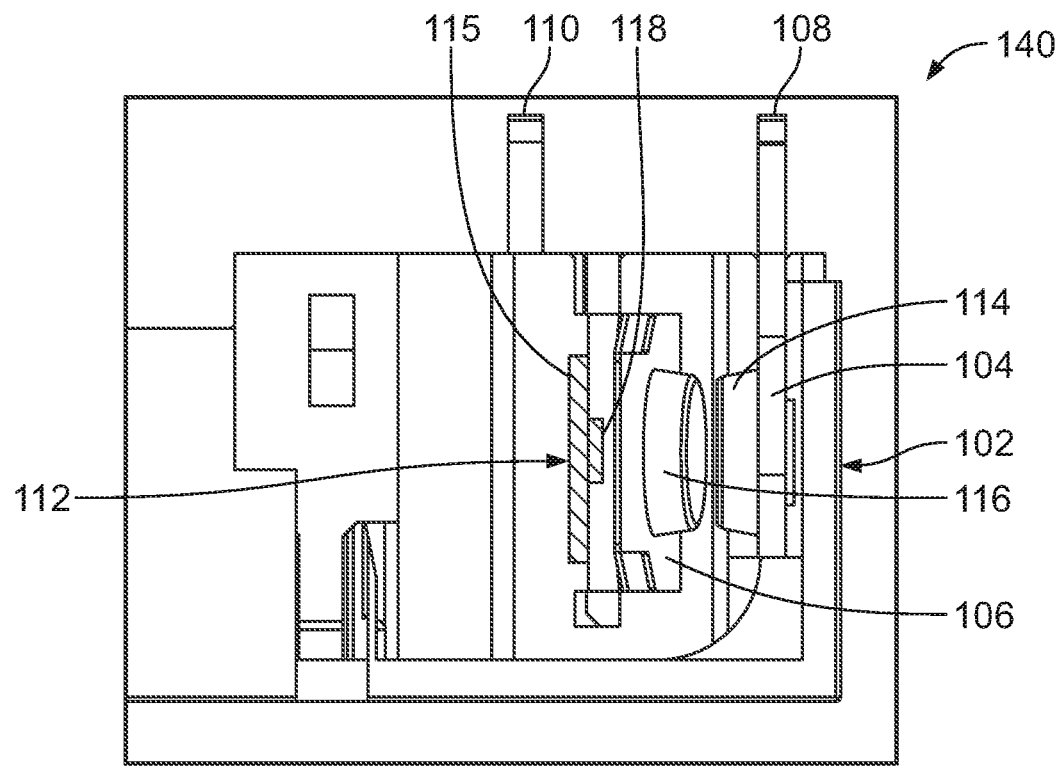
FIG. 3 is a cut-away front view of another example relay construction as disclosed herein.

FIG. 3 illustrates a cut-away front view of an example relay construction 140 as disclosed herein comprising a housing 102, a pair of contacts 104 and 106, electrical terminals 108 and 110 connected with the respective contacts 104 and 106, and the remaining elements featured in the relay construction as illustrated in FIG. 1E. In this example, the relay construction 140 comprises a temperature sensor 112 that is the same as that described above for the example illustrated in FIG. 2, comprising a printed circuit board 116, a sensor element 118 attached thereto, and an electrical terminal extending therefrom (not shown). Alternatively, as noted above the temperature sensor may be configured to receive and/or provide signals wirelessly. In this example, the temperature sensor element is positioned differently within the housing, and specifically is positioned adjacent one of the contacts. In this particular example, the temperature sensor element is positioned a distance above contact 106, which is a movable contact. In this example, the temperature sensor element is positioned along a plane that is perpendicular to a longitudinal axis running along the length of the contacts. In an example, the temperature sensor element is positioned a distance relative to the movable sensor that will vary depending on the particular relay and the travel distance of the movable contact 106. In an example, the temperature sensor is positioned about 0.5 mm or more from the contact pad 116 of the movable contact 106. In an example, the temperature sensor may be positioned from about 0.5 to 5 mm from contact pad 116 the movable contact.

Figure 4:
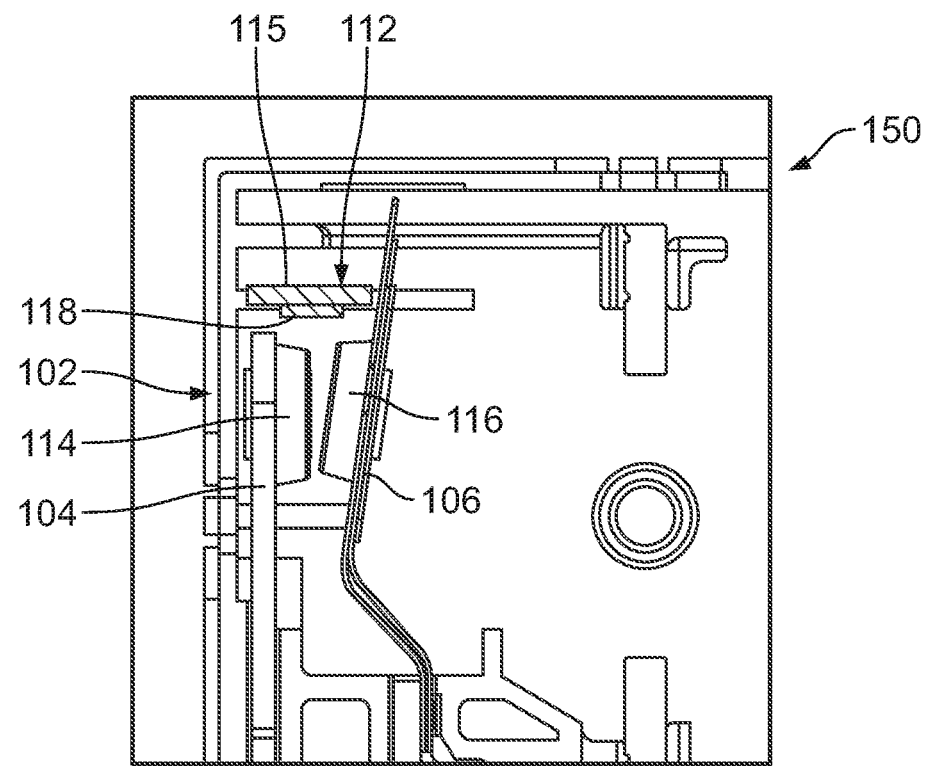
FIG. 4 is a cut-away top view of another example relay construction as disclosed herein.

FIG. 4 illustrates a cut-away top view of an example relay construction 150 as disclosed herein comprising a housing 102, a pair of contacts 104 and 106, and the remaining elements featured in the relay construction as illustrated in FIG. 1E. In this example, the relay construction 150 comprises a temperature sensor 112 that is the same as that described above for the example illustrated in FIG. 2, comprising a printed circuit board 116, a sensor element 118 attached thereto, and an electrical terminal extending therefrom (not shown), or may be configured to receive and/or provide information wirelessly. In this example, the temperature sensor element is positioned differently within the housing, and specifically is positioned in front of and adjacent the pair of contacts. In this particular example, the temperature sensor element is positioned a distance in front of the pads 114 and 116 of both contacts 104 and 106. In this example, the temperature sensor element is positioned along a plane that is perpendicular to and intersects with a longitudinal axis running along the length of the contacts. In an example, the temperature sensor element is positioned from about 0.5 mm to about 8 mm from the pads 114 and 116 of the respective contacts 104 and 106.

Figure 5:
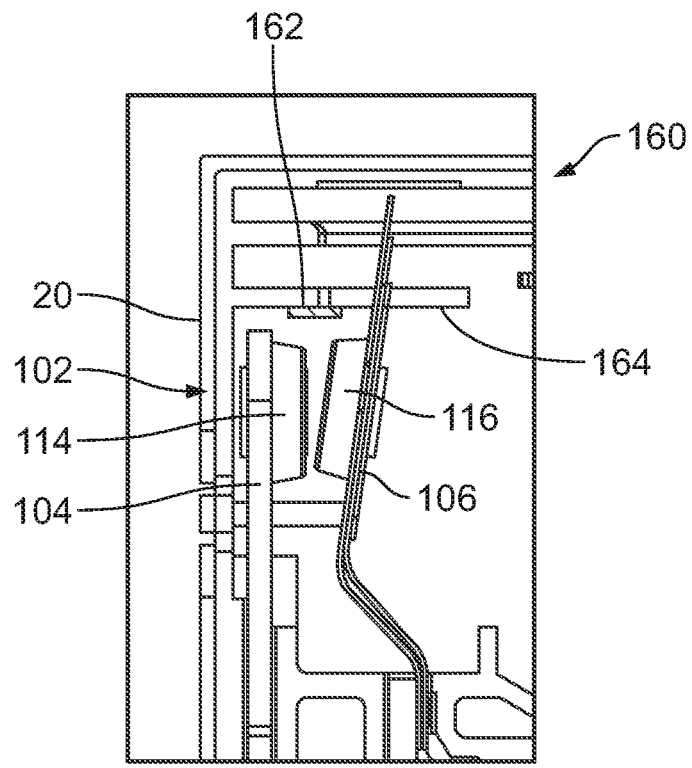
FIG. 5 is a cut-away top view of another example relay construction as disclosed herein.

FIG. 5 illustrates a cut-away top view of an example relay construction 160 as disclosed herein comprising a housing 102, a pair of contacts 104 and 106, and the remaining elements featured in the relay construction as illustrated in FIG. 1E. In this example, a temperature sensor 162 is positioned within the housing adjacent an internal housing structure which may be existing or which may be formed, e.g., molded, for the purpose of attaching the temperature sensor. In this example, the temperature sensor 162 is bonded or otherwise attached to an internal housing wall 164 that extends inwardly from a housing side 20 and that is positioned a distance in front of the pads 114 and 116 of the sensors 104 and 106. A feature of the temperature sensor 162 of this particular example is that the temperature sensor 162 is in the form of a sensor element selected from the types mentioned above, that is bonded or otherwise attached to a relay structure without a substrate PC board or the like. The temperature sensor 162 may be in electrical contact with an electrical terminal (not shown) extending from the housing 102 for purposes of electrically connecting therewith to receive the output signal from the temperature sensor, or alternatively may be configured to receive and/or provide a signal wirelessly from the relay. In an example, the sensor element may be a transducer. In this example, the temperature sensor 162 is positioned a distance in front of the pair of contacts 104 and 106, and more specifically along a plane perpendicular to and intersecting a longitudinal axis running along the length of the contacts.

In an example embodiment, the temperature sensor 162 is positioned a distance directly in front of the contacts. In an example embodiment, the temperature sensor is positioned a distance of from about 0.5 mm to 5 mm, and from about 0.1 mm to 1.5 mm from the contact pads 114 and 116 of the respective contacts 104 and 106. In an example embodiment, the temperature sensor element is positioned approximately 0.3 mm from the pads of the contacts. It is to be understood that while placement distances for the temperature sensor have been provided, such distance can and will vary depending on such factors as the type of relay as well as the particular type of sensor element that is used.

Figure 6:
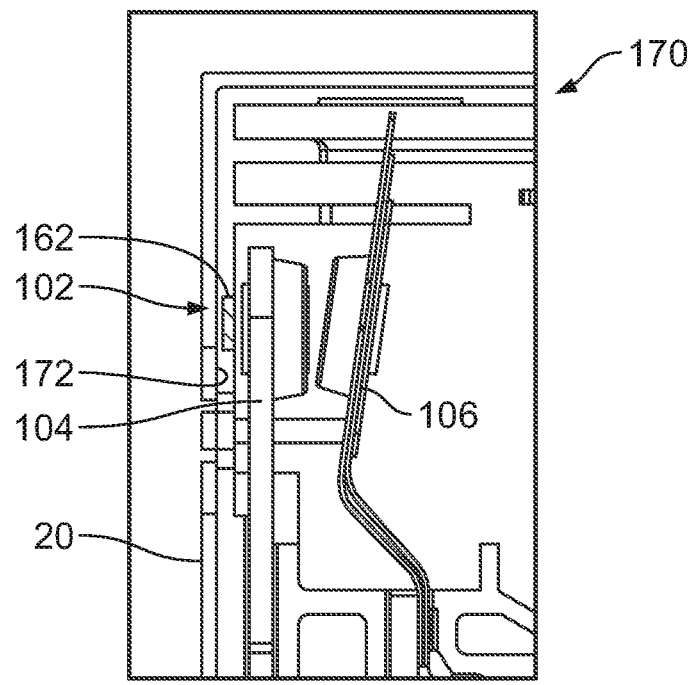
FIG. 6 is a cut-away top view of another example relay construction as disclosed herein.

FIG. 6 illustrates a cut-away top view of an example relay construction 170 as disclosed herein comprising a housing 102, a pair of contacts 104 and 106, electrical terminals 108 and 110 connected with the respective contacts 104 and 106, and the remaining elements featured in the relay construction as illustrated in FIG. 1E. Like the example described above and illustrated in FIG. 5, in this example a temperature sensor 162 is configured in the same manner as described for the example relay construction of FIG. 5, and may be electrically connected with an electrical terminal extending from the housing (not shown), or alternatively may be configured to receive and/or provide signals wirelessly from the relay. The temperature sensor is positioned within the housing adjacent an internal housing structure which may be existing or which may be formed, e.g., molded, for the purpose of attaching the temperature sensor. In this particular example, the temperature sensor 162 is bonded or otherwise attached to an internal housing wall 172 that extends along an inside surface of a housing side 20 and that is positioned a distance behind one of the contacts. In this example, the temperature sensor 162 is positioned behind the stationary contact 104. In an example, the temperature sensor 162 may be positioned within the same distance parameters noted above for the example relay construction illustrated in FIG. 5 as measured from a backside surface of the contact 104 to the sensor 162.

Figure 7:
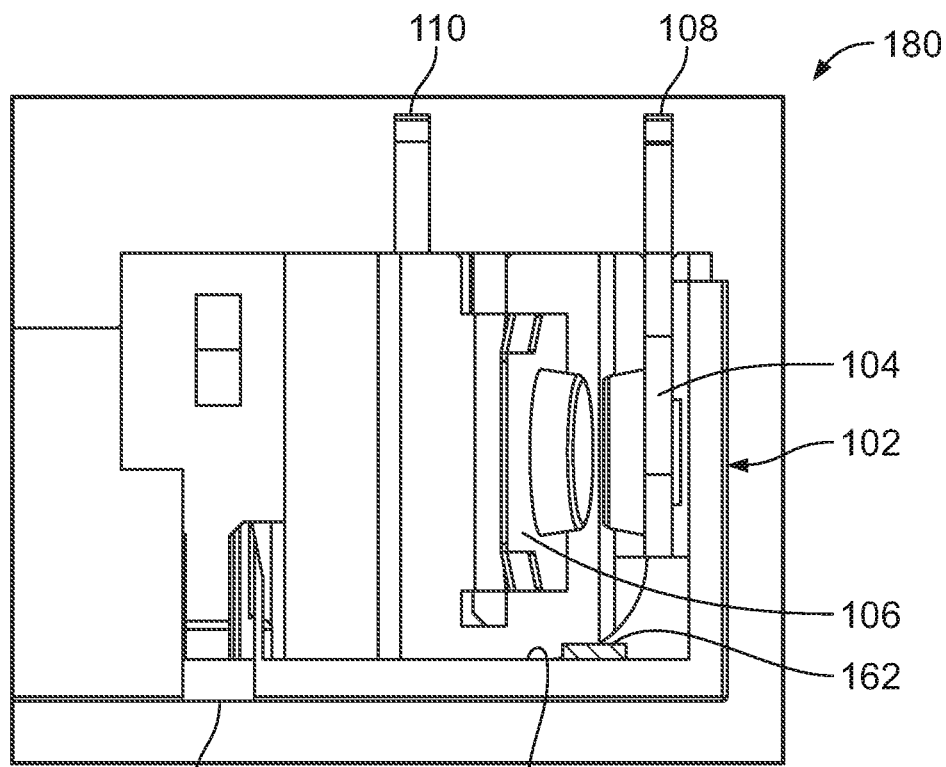
FIG. 7 is a cut-away front view of another example relay construction as disclosed herein.

FIG. 7 illustrates a cut-away front view of an example relay construction 180 as disclosed herein comprising a housing 102, a pair of contacts 104 and 106, electrical terminals 108 and 110 connected with the respective contacts 104 and 106, and the remaining elements featured in the relay construction as illustrated in FIG. 1E. Like the example described above and illustrated in FIG. 5, in this example a temperature sensor 162 is electrically connected with an electrical terminal extending from the housing (not shown), or may be configured to receive and/or provide a signal wirelessly. The temperature sensor 162 is positioned within the housing adjacent an internal housing structure which may be existing or which may be formed, e.g., molded, for the purpose of attaching the temperature sensor. In this particular example, the temperature sensor 162 is bonded or otherwise attached to an internal surface 182 of the housing top 14 and that is positioned a distance directly below the pads 114 and 116 of the contacts 104 and 106. In an example, the temperature sensor 162 may be positioned from about 1 to 10 mm, and from about 2 to 5 mm as measured from the pads to the sensor.

Figure 8:
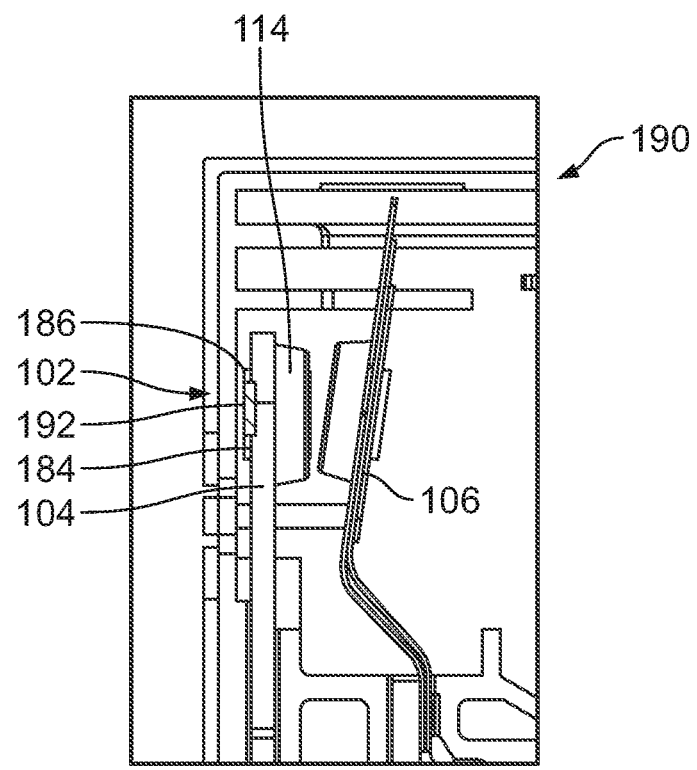
FIG. 8 is a cut-away top view of another example relay construction as disclosed herein.

FIG. 8 illustrates a cut-away top view of an example relay construction 190 as disclosed herein comprising a housing 102, a pair of contacts 104 and 106, and the remaining elements featured in the relay construction as illustrated in FIG. 1E. In this example, a temperature sensor 192 is positioned within the housing and may be formed on, e.g., by plasma vapor deposition process or the like, bonded to or otherwise attached to a structure of one of the contacts 104 and 106. While the temperature sensor of this example is directly attached to the contact, it is to be understood that temperature sensors as used in such example may either be formed transducers, i.e., formed on the contact itself, or may be existing packages or transducers that are (after formation) attached to the contact. In this example, the temperature sensor 182 is in the form of a sensor element selected from the types mentioned above, and is in electrical contact with an electrical terminal (not shown) extending from the housing 102 for purposes of electrically connecting therewith to receive the output signal from the temperature sensor, or configured to provide or receive a signal wirelessly from the relay construction. In an example, the sensor element may be a transducer (either formed on the contact or existing and attached to the contact). In this example, the temperature sensor 182 is attached to a backside surface 184 of the stationary contact 104 opposite the pad 114. In an example, the contact pad 114 may be configured so that a portion 186 of the pad extends through the contact 104 so that the temperature sensor is attached to a backside portion of the contact pad itself. Such attachment of the temperature sensor promotes an increased response to contact temperature changes. In an example, for some use applications, it may be desired that the sensing element be electrically isolated from the contact surface. Such electrical isolation may be accomplished by various methods including and not limited to deposition of an insulating layer, coating or film on the contact, or packaging of the sensing element in a dielectric enclosure or case formed from an electrically insulating material such as a polymer or the like. In an example, such an approach would operate to minimize thermal insulation while maximizing electrical insulation.

Figure 9:
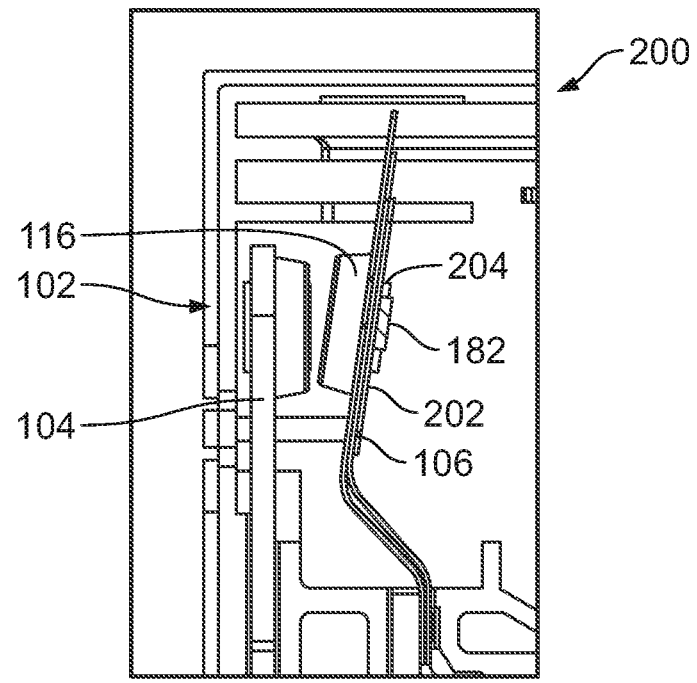
FIG. 9 is a cut-away top view of another example relay construction as disclosed herein.

FIG. 9 illustrates a cut-away top view of an example relay construction 200 as disclosed herein comprising a housing 102, a pair of contacts 104 and 106, and the remaining elements featured in the relay construction as illustrated in FIG. 1E. Like the example described above and illustrated in FIG. 8, in this example a temperature sensor 182 is disposed in the housing and is electrically connected with an electrical terminal extending from the housing (not shown), or may be configured to receive or provide a signal wirelessly from the relay construction. In this example, the temperature sensor 182 is attached to a backside surface 202 of the movable contact 106 opposite the pad 116. In an example, the contact pad 116 may be configured so that a portion 204 of the pad extends through the contact 106 so that the temperature sensor is attached to a backside portion of the contact pad itself. Such attachment of the temperature sensor promotes and increased response to contact temperature changes.

Figure 10:
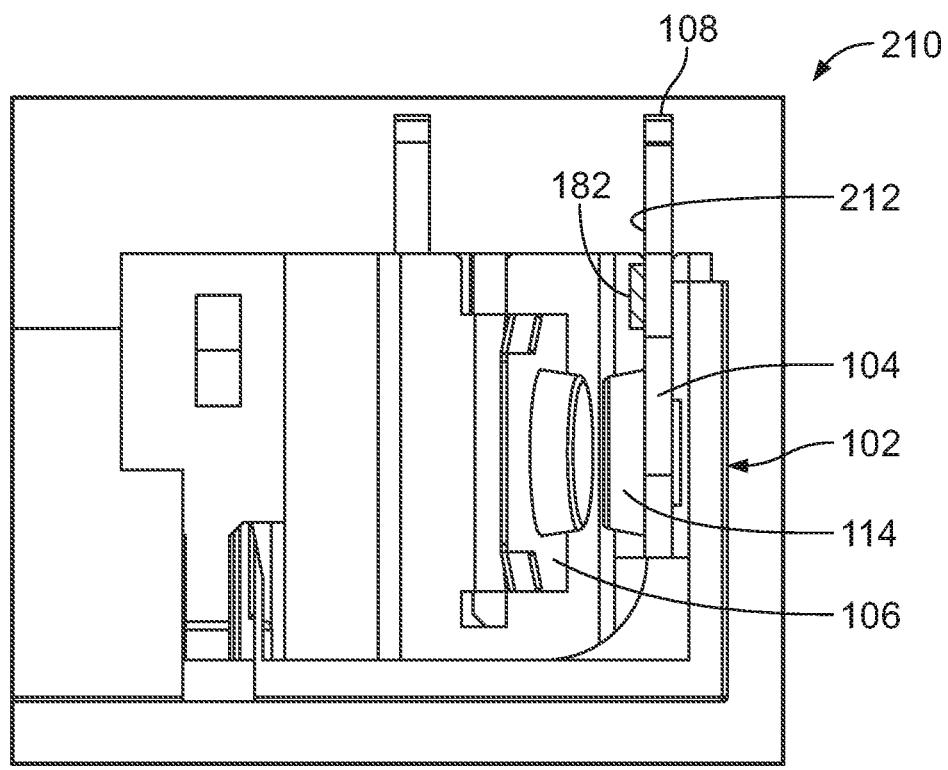
FIG. 10 is a cut-away front view of another example relay construction as disclosed herein.

FIG. 10 illustrates a cut-away front view of an example relay construction 210 as disclosed herein comprising a housing 102, a pair of contacts 104 and 106, and the remaining elements featured in the relay construction as illustrated in FIG. 1E. Like the example described above and illustrated in FIG. 8, in this example a temperature sensor 182 is disposed in the housing and is electrically connected with an electrical terminal extending from the housing (not shown), or may be configured to receive or provide a signal wirelessly from the relay construction. In this example, the temperature sensor 182 is attached to section 212 of the stationary contact 104 a distance away from the contact pad 114 and towards the electrical terminal 108. Alternatively, the temperature sensor may be attached to a section of the movable contact 106 a distance from the contact pad 116. In an example, the temperature sensor 182 is positioned a distance of from about 0.2 mm to 25 mm, from about 0.5 mm to 19 mm, and from about 0.8 to 10 mm from the contact pad 114 of the contact 104. In an example embodiment, the temperature sensor is positioned approximately 1.3 mm from the pad of the contact. It is to be understood that while placement distances for the temperature sensor have been provided, such distance can and will vary depending on such factors as the type of relay as well as the particular type of sensor element that is used.

While the relay constructions disclosed herein as illustrated in FIGS. 2 to 10 have provided examples of different embodiments comprising the use of different types of temperature sensors and placement positions of the same within the relay, it may be desired to include two or more temperature sensors within a relay for the purpose of providing differential/gradient temperature measurement. Such differential/gradient temperature measurement obtainable through the use of multiple temperature sensors is desired for providing for a near instantaneous calculation of contact temperature. Accordingly, the following example relay constructions are provided for purposes of reference of such embodiments comprising multiple temperature sensors disposed therein.

Figure 11:
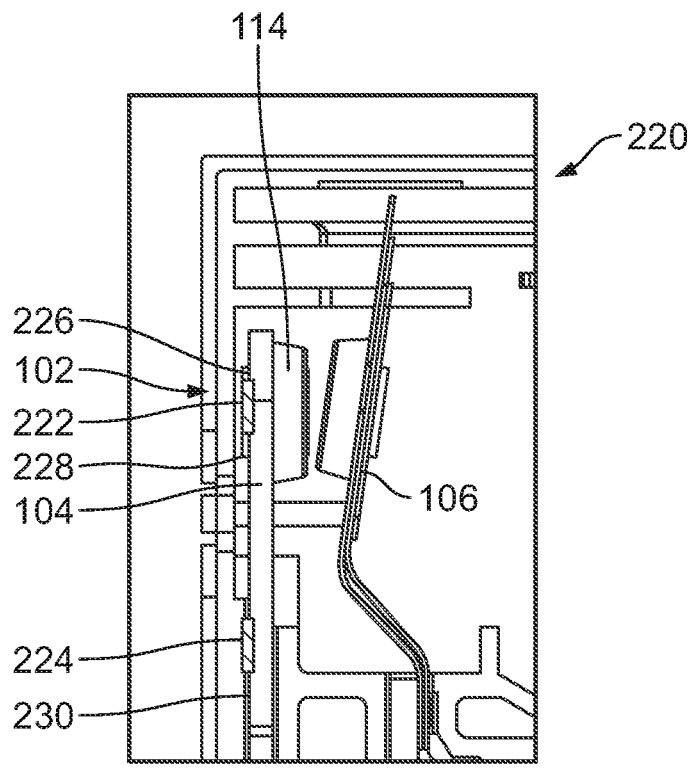
FIG. 11 is a cut-away top view of another example relay construction as disclosed herein.

FIG. 11 illustrates a cut-away top view of an example relay construction 220 that is somewhat similar to the example illustrated in FIG. 8, comprising a housing 102, a pair of contacts 104 and 106, and the remaining elements featured in the relay construction as illustrated in FIG. 1E. In this example, the relay construction comprises two temperature sensors 222 and 224 that are positioned within the housing and may be formed on, e.g., by plasma vapor deposition process or the like, bonded to or otherwise attached to a structure of one of the contacts 104 and 106. In this example, the temperature sensors 222 and 224 are in the form of a sensor elements selected from the types mentioned above, and are in electrical contact with one or more electrical terminals (not shown) extending from the housing 102 for purposes of electrically connecting therewith to receive the output signals from the temperature sensors. Alternatively, the temperature sensors 222 and 224 may be configured to receive and/or provide signals wirelessly from the relay construction. In an example, the sensors may be transducers. In this example, the first temperature sensor 222 is attached to a backside surface 226 of the stationary contact 104 opposite the pad 114. In an example, the contact pad 114 may be configured so that a portion 228 of the pad extends through the contact 104 so that the temperature sensor is attached to a backside portion of the contact pad itself. The second temperature sensor 224 is attached to a section 230 of the contact a distance away from the pad 114. In an example, the placement position of the second temperature sensor relative to the first temperature sensor may vary depending on the types of sensors that are used, the particular attachment point of the first sensor, as well as the type of relay being used. In an example, where both sensors are attached to the contact, the distance between the two sensors may be from about 1.5 mm to 20 mm, from about 2 mm to 18 mm, and from about 5 mm to 15 as measured between the two sensors. In an example embodiment, the second temperature sensor is positioned approximately 10 mm from the first temperature sensor.

Figure 12:
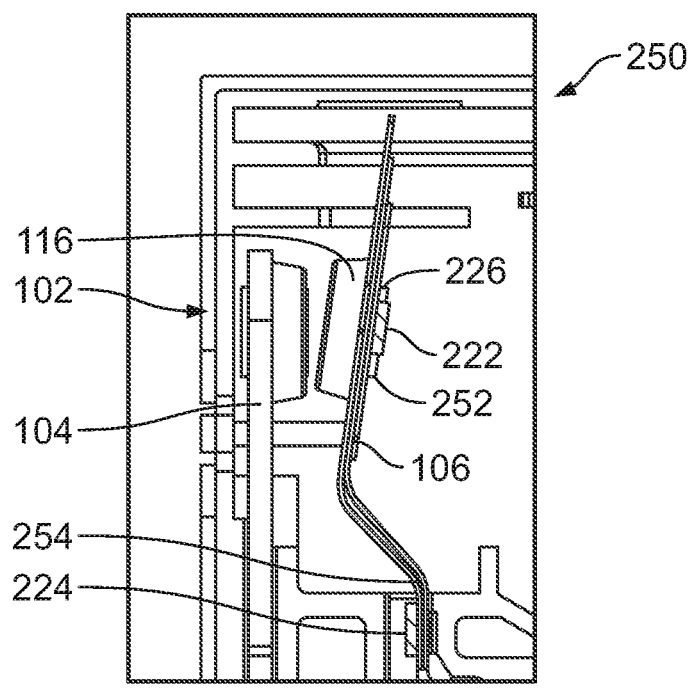
FIG. 12 is a cut-away top view of another example relay construction as disclosed herein.

FIG. 12 illustrates a cut-away top view of an example relay construction 250 that is somewhat similar to the example illustrated in FIG. 9, comprising a housing 102, a pair of contacts 104 and 106, and the remaining elements featured in the relay construction as illustrated in FIG. 1E. In this example, the relay construction comprises two temperature sensors 222 and 224 that are positioned within the housing and may be formed on, e.g., by plasma vapor deposition process or the like, bonded to or otherwise attached to a structure of one of the contacts 104 and 106. In this example, the temperature sensors 222 and 224 are similar in form to those described above for the example illustrated in FIG. 11. In this example, the first temperature sensor 222 is attached to a backside surface 226 of the movable contact 106 opposite the pad 116. In an example, the contact pad 116 may be configured so that a portion 252 of the pad extends through the contact 106 so that the temperature sensor is attached to a backside portion of the contact pad itself. The second temperature sensor 224 is attached to a section 254 of the contact a distance away from the pad 116. In an example, the distance between the first and second sensor placement positions may be within the distance parameters described above for the example illustrated in FIG. 11.

Figure 13:
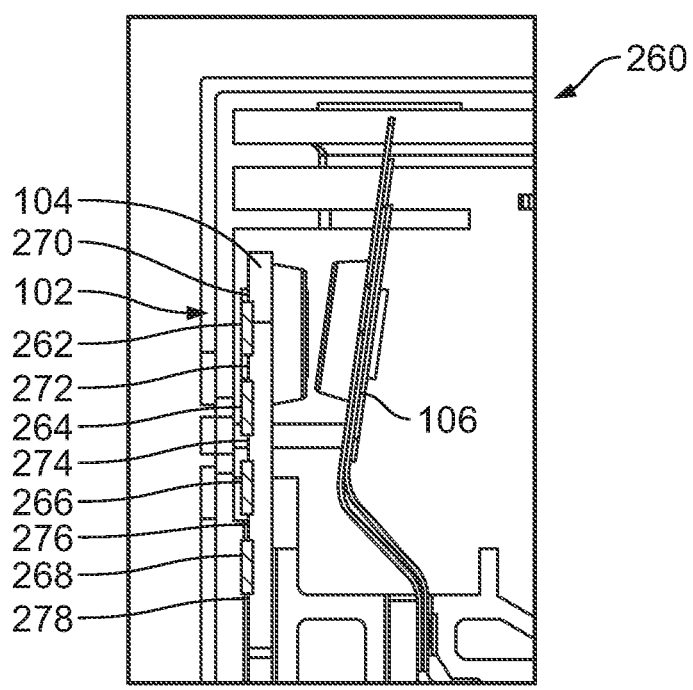
FIG. 13 is a cut-away top view of another example relay construction as disclosed herein.

FIG. 13 illustrates a cut-away top view of an example relay construction 260 that is somewhat similar to the example illustrated in FIG. 11, comprising a housing 102, a pair of contacts 104 and 106, and the remaining elements featured in the relay construction as illustrated in FIG. 1E. In this example, the relay construction comprises more than two temperature sensors. The temperature sensors may be formed on, e.g., by plasma vapor deposition process or the like, bonded to or otherwise attached to a structure of one of the contacts 104 and 106. In this example, the relay construction comprises four temperature sensors 262, 264, 266 and 268 that are similar in form to those described above for the example illustrated in FIG. 11. In this example, the first temperature sensor 262 is attached to a backside surface 270 of the stationary contact 104 opposite the pad 114. In an example, the contact pad 114 may be configured so that a portion 272 of the pad extends through the contact 104 so that the first temperature sensor is attached to a backside portion of the contact pad itself. The second, third and fourth temperature sensors 264, 266 and 268 are positioned in serial fashion on respective sections 274, 276 and 278 of the contact 104 an increasing distance away from the first sensor 262, wherein each of the sensors are spaced apart from one another. In an example, the distance between the first and second sensor, the second and third sensor, and the third and fourth sensor may be equal. It is to be understood however that such equidistant sensor spacing may not be the case depending on such factors as the type of sensors being used, e.g., whether they are all the same or different, and the type of relay. Also, while the example relay construction of FIG. 13 illustrates placement of the multiple temperature sensors on the stationary contact, it is to be understood that such multiple temperature sensors may be placed on the movable contact. In an example, where the multiple sensors are of the same type and equally spaced apart from one another, the distance between adjacent sensors may be from about 0.5 mm to 15 mm, from about 1 mm to 10 mm, and from about 2 mm to 5 mm. In an example embodiment, the distance between adjacent multiple sensors as illustrated in FIG. 13 is approximately 3 mm.

While example relay constructions comprising multiple temperature sensors have been disclosed and illustrated in FIGS. 11 to 13, it is to be understood that other relay construction examples as disclosed herein may comprise multiple temperature sensors positioned or attached or formed differently from the examples of FIGS. 11 to 13. For example, relay constructions may comprise multiple temperature sensors positioned along an existing internal structure of the relay construction and/or may be disposed on a member or substrate such as a printed circuit board or the like that is positioned within the relay construction at a location. All such example embodiments comprising multiples temperature sensors are intended to be within the scope of relay constructions as disclosed herein.

While certain types and constructions of relay constructions comprising temperature sensing capabilities have been disclosed and illustrated, it is to be understood that such examples have been provided for purposes of reference and illustration, and that relay constructions as disclosed herein should not be limited to the particular embodiments discussed above. For example, relay constructions comprising more than one set of electrical contacts are understood to be within the scope of the disclosure, wherein temperature sensors may be positioned within the relay to monitor one or all sets of such contacts. Thus, relay construction embodiments other than those discussed and illustrated comprising temperature sensing and monitoring features and elements as disclosed herein are understood to be within the scope of this description. For example, it is understood that all types of relay constructions comprising electrical contacts and internal temperature sensing elements are intended to be within the scope of relay constructions as disclosed herein and as defined by the following claims.

What is claimed is:

1. An electromechanical relay comprising:
   an external housing;
   a pair of switchable electrical contacts disposed within the housing, wherein the electrical contacts each comprises a contact pad;
   an element for activating the pair of electrical contacts; and
   a temperature sensing element disposed within the housing adjacent the electrical contracts, wherein the temperature sensing element is positioned from about 0.5 mm to 10 mm from one of the contact pads.

2. The relay as recited in claim 1 wherein the temperature sensing element is attached to one of a wall structure in the housing of a surface of one of the electrical contacts.

3. The relay as recited in claim 1 comprising two or more temperature sensing elements disposed within the housing.

4. The relay as recited in claim 1 wherein the temperature sensing element is attached to a member that is mounted within the housing.

5. The relay as recited in claim 1 wherein the temperature sensing element is attached to a surface of one of the electrical contacts.

6. The relay as recited in claim 1 wherein the temperature sensing element is disposed along an internal structure of the relay.

7. The relay as recited in claim 6 wherein the internal structure is adjacent one or both of a stationary one and a movable one of the electrical contacts.

8. A system for detecting a temperature increase within an electromechanical relay, the system comprising:
   an electromechanical relay comprising:
      an external housing;
      a pair of switchable electrical contacts disposed within the housing comprising a movable electrical contact and a stationary electrical contact, wherein each of the electrical contacts comprise a contact pad;

an element for activating the pair of electrical contacts; and a temperature sensing element disposed within the housing and positioned within 1 mm to 10 mm from one of the contact pads adjacent one or both of the electrical contracts;

wherein an output signal provided by the temperature sensing element is monitored to determine the temperature within the electromechanical relay.

9. The system as recited in claim 8 wherein the temperature sensing element is selected from the group consisting of resistance temperature detectors, negative temperature coefficient thermistors, thermopile sensors, thermocouples, and combinations thereof.

10. The system as recited in claim 8 wherein the relay comprises more than one pair of switchable electrical contacts disposed in the housing.

11. The system as recited in claim 8 wherein the temperature sensing element is attached to an element that is fixed within the housing.

12. The system as recited in claim 8 wherein the temperature sensing element is attached to an internal structure of the housing.

13. The system as recited in claim 8 wherein the temperature sensing element is positioned along a plane that is perpendicular to and intersects with a longitudinal axis running along the length of the pair of electrical contacts.

14. The system as recited in claim 8 wherein the temperature sensing element is attached to a surface of one of the electrical contacts.

15. The system as recited in claim 8 comprising another temperature sensing element that is positioned a distance from the temperature sensing element.

16. A method for determining a temperature within an electromechanical rely comprising the steps of:

operating an electromechanical relay comprising an external housing with a pair of switchable electrical contacts disposed within the housing to cause the electrical contacts to make contact with one another, wherein the electrical contacts each comprise a contact pad, and wherein a temperature sensing element is disposed within the housing within about 0.5 mm to 10 mm from one of the contact pads and provides an output signal; and monitoring the output signal to determine the temperature within the housing during the step of operating.

17. The method as recited in claim 16 wherein the temperature sensing element is attached to a member that is fixed within the housing.

18. The method as recited in claim 16 wherein the temperature sensing element is attached to an internal structure of the relay.

19. The method as recited in claim 16 wherein the temperature sensing element is attached to a surface of one of the electrical contracts.

20. The method as recited in claim 16 comprising more than one temperature sensing element positioned at different locations within the relay, and wherein the step of monitoring comprises monitoring output signals from the more than one temperature sensing elements.

* * * * *